(12) United States Patent
Zhang et al.

(10) Patent No.: US 12,125,185 B2
(45) Date of Patent: Oct. 22, 2024

(54) RECONSTRUCTION OF THIN WALL FEATURES MARGINALLY RESOLVED BY MULTI-DIMENSIONAL IMAGES

(71) Applicant: DigiM Solution LLC, Winchester, MA (US)

(72) Inventors: Shuang Zhang, Winchester, MA (US); Aijun Zhu, Winchester, MA (US)

(73) Assignee: DigiM Solution LLC, Winchester, MA (US)

( * ) Notice: Subject to any disclaimer, the term of this patent is extended or adjusted under 35 U.S.C. 154(b) by 812 days.

(21) Appl. No.: 17/204,726

(22) Filed: Mar. 17, 2021

(65) Prior Publication Data

US 2021/0304391 A1    Sep. 30, 2021

Related U.S. Application Data

(60) Provisional application No. 62/994,603, filed on Mar. 25, 2020.

(51) Int. Cl.
*G06T 7/00* (2017.01)
*G01N 21/88* (2006.01)
*G06T 7/11* (2017.01)

(52) U.S. Cl.
CPC ....... *G06T 7/0004* (2013.01); *G01N 21/8851* (2013.01); *G06T 7/11* (2017.01); *G01N 2021/8864* (2013.01); *G06T 2207/30108* (2013.01)

(58) Field of Classification Search
CPC .................. G06T 7/0004; G06T 7/11; G06T 2207/30108; G01N 21/8851; G01N 2021/8864
See application file for complete search history.

(56) References Cited

U.S. PATENT DOCUMENTS

| | | | | |
|---|---|---|---|---|
| 2017/0014346 A1* | 1/2017 | Santos | ................ | A61K 31/496 |
| 2022/0099551 A1* | 3/2022 | Saxena | ................ | G01N 15/088 |

OTHER PUBLICATIONS

Gamble, J.F, et al., "Application of X-ray microtomography for the characterisation of hollow polymer-stabilised spray dried amorphous dispersion particles", Int J Pharmaceut., vol. 510, No. 1, Aug. 20, 2016, pp. 1-8.

(Continued)

*Primary Examiner* — Charles T Shedrick
(74) *Attorney, Agent, or Firm* — Hamilton, Brook, Smith & Reynolds, P.C.

(57) ABSTRACT

Systems, methods, and computer-readable media to reconstruct thin wall features of domain features in images, which are marginally resolved by a multi-dimensional image, using geometrical continuity. The technique permits reconstruction of features such as structure walls that have a variable thickness, where a thin portion of the wall feature is marginally resolved by an image due to resolution limitations, and the marginally resolved portion of the feature is incompletely segmented. Using the systems, methods, and computer-readable media, such a wall feature can be recognized as a broken wall that misrepresents the completeness of the feature, and can be reconstructed as a completed wall feature.

23 Claims, 6 Drawing Sheets
(3 of 6 Drawing Sheet(s) Filed in Color)

(56) References Cited

OTHER PUBLICATIONS

Gamble, J.F., et al., "Application of imaging based tools for the characterisation of hollow spray dried amorphous dispersion particles", Int J Pharmaceut., vol. 465, No. 1-2, Apr. 25, 2014, pp. 210-217.

Gonzalez, R. C., et al., Digital image Processing, Third Edition, Prentice Hall, Version 3.0, 2008, 271 pages.

Hancock, B.C, et al., "Characteristics and significance of the amorphous state in pharmaceutical systems", J Pharm Sci., vol. 86, No. 1, Jan. 1997, pp. 1-12.

Heng, D., et al., "Focused-ion-beam milling: A novel approach to probing the interior of particles used for inhalation aerosols", Pharm Res-Dord., vol. 24, No. 9, Apr. 3, 2007, pp. 1608-1617.

Littringer, E. M., "Spray dried mannitol carrier particles with tailored surface properties—The influence of carrier surface roughness and shape.", Eur J Pharm Biopharm., vol. 82, No. 1, Sep. 2012, pp. 194-204.

Newman, A., et al., "Assessing the performance of amorphous solid dispersions.", Journal of Pharmaceutical Sciences, vol. 101, No. 4, Apr. 2012, pp. 1355-1377.

Ohta, M., et al., "A study of the differences between two amorphous spray-dried samples of cefditoren pivoxil which exhibited different physical stabilities", Int J Pharmaceut., vol. 289, No. 1-2, Jan. 31, 2005, pp. 31-38.

Poozesh, S, et l., "Understanding the process-product-performance interplay of spray dried drug-polymer systems through complete structural and chemical characterization of single spray dried particles", Powder Technol., vol. 320, Oct. 2017, pp. 685-695.

Vehring R., "Pharmaceutical particle engineering via spray drying", Pharm Res-Dord., vol. 25, No. 5, May 2008, pp. 999-1022.

Vehring, R, et al., "Particle formation in spray drying.", J Aerosol Sci., vol. 38, No. 7, Jul. 2007, 728-746.

Witten, I.H., "Data Mining: Practical Machine Learning Tools and Techniques" Morgan Kaufmann, 2016, 534 pages.

Wong, J., "A Novel Technique to Probe the Internal Architecture of Pharmaceutical Particles", Pharm Res-Dord., vol. 31, No. 11, May 28, 2014, pp. 3085-3094.

Yu L., "Amorphous pharmaceutical solids: preparation, characterization and stabilization", Adv Drug Deliver Rev., vol. 48, No., 1, May 16, 2001, pp. 27-42.

Zhang, S., et al., "Quantitative Characterization of Crystallization in Amorphous Solid Dispersion Drug Tablets Using X-Ray Micro-Computed Tomography", Microscopy and Microanalysis., vol. 24, No. 2, pp. 2018, pp. 1400-1401.

* cited by examiner

Note: Arrows show data flow.

RECONSTRUCTION OF THIN WALL FEATURES MARGINALLY RESOLVED BY MULTI-DIMENSIONAL IMAGES

RELATED APPLICATION

This application claims the benefit of U.S. Provisional Application No. 62/994,603, filed on Mar. 25, 2020. The entire teachings of the above application are incorporated herein by reference.

BACKGROUND

In image analysis applications, when a domain feature has a wall with variable thickness, and the thin portion of the wall of the domain feature is marginally resolved in an image due to resolution limitation, the segmentation of the marginally resolved portion of the wall feature can be incomplete. Because of this segmentation inaccuracy, subsequent analysis of the image can mistakenly recognize the wall feature as a broken wall, and can thereby misrepresent the completeness of the domain feature. The accuracy of the subsequent analysis of the domain feature will be negatively impacted to different degrees. For example, classification of particles based on whether they are in full closure, or broken with an opening, will fail. The analysis of wall thickness distribution will miss the portion of the wall that is incomplete segmented, and hence become less representative.

There is, therefore, a need to provide techniques of image processing that improve the analysis of marginally resolved thin wall features.

SUMMARY

Systems, methods, and computer readable media embodiments can be used to reconstruct thin walls of domain features in images, which are marginally resolved by a multi-dimensional image. This permits reconstruction of features such as walls composed of a first material that have a variable thickness, where a thin portion of the wall feature is marginally resolved by an image due to resolution limitations, and the marginally resolved portion of the wall feature is incompletely segmented. These wall features, composed of a material referred to herein as a "first material," are often used to separate a different material phase or different material phases, collectively referred to as a "second material" hereafter. One example of such images is three-dimensional X-Ray microscopy images of solid particles (referred to as domain features hereafter) where solid walls composed of an amorphous drug compound (a first material) separates air (a second material) into internal air void, and external air. Using the systems, methods, and computer readable media embodiments, such a wall feature can be recognized as a broken wall that misrepresents the completeness of the domain feature, and can be reconstructed as a completed wall feature.

One embodiment is a computer-implemented method of reconstructing a feature of an image for quantitative image analysis. The computer-implemented method comprises initially segmenting image intensity data, in a manner automated by a processor, the initial segmentation comprising labeling each of a plurality of image intensity data components, stored in a first data structure, with a segmentation label value, thereby producing initially segmented image data with at least two material labels, a label for a first material and a label for a second material, stored in a second data structure. Second material regions in the initial segmentation that the wall feature is intended to separate are further split into geometrically distinctive second material domain pockets, in a manner automated by the processor, thereby producing separated second material pocket data, stored in a third data structure. Second material pockets that are internal to domain features, formed of the first material, are distinguished, based on the separated second material pocket data, in a manner automated by the processor, thereby producing internal second material pocket data stored in a fourth data structure. Solid features of the image that comprise at least one internal second material pocket are reconstructed, in a manner automated by the processor, based at least on the internal second material pocket data. The reconstructed solid features are stored in a fifth data structure, thereby permitting quantitative analysis of the image by the processor based at least on the reconstructed solid features.

In further related embodiments, the computer-implemented method may further comprise geometrically distinguishing, in a manner automated by the processor, domain features in the image that include at least one internal second material pocket from domain features in the image without any second material pocket. Separating the second material regions into geometrically distinctive second material pockets may comprise, in a manner automated by the processor, determining at least one of: a distance transform, a local extreme, and a numerical reconstruction algorithm. Distinguishing second material pockets that are internal to domain features may comprise determining a degree of sphericity of the second material pockets. The wall features of domain features in an image may comprise, for example, at least one of: thin walls of a closed-pore insulation foam, thin sections of a variable diameter fiber, thin walls of a separation plate in a mechanical or electrical assembly, and thin walls of a material particle sample. In the embodiment of the domain features being material particles, the computer-implemented method may further comprise performing a particle size distribution analysis, in a manner automated by the processor, based at least on the reconstructed domain features using this method. The particle size distribution analysis may comprise determining a particle size distribution of both particles with an internal second material pocket (for example, air void) and particles without an internal second material pocket. The image intensity data components may comprise at least one of pixels and voxels, and the segmentation label values may comprise a label for the first material and a label for the second material.

Another embodiment is a computer system for reconstructing a feature of an image for quantitative image analysis. The computer system comprises an initial segmentation module configured to initially segment image intensity data, in a manner automated by a processor, the initial segmentation comprising labeling each of a plurality of image intensity data components corresponding to a plurality of material phases, stored in a first data structure, with a segmentation label value, thereby producing initially segmented image data with at least two material labels, a label for a first material and a label for a second material, stored in a second data structure. A watershed processing module is configured to separate second material (for example, air void) regions in the initially segmented image data into geometrically distinctive second material pockets, in a manner automated by the processor, thereby producing separated second material pocket data, stored in a third data structure. An internal second material processing module is configured to distinguish second material pockets that are internal to domain features, formed of the first material, based on the separated second material pocket data, in a manner automated by the processor, thereby producing internal second material data stored in a fourth data structure. A hollow solid reconstruction module is configured to reconstruct domain features of the image that comprise at least one second material pocket internal to the feature, based at least on the internal second material data, in a manner automated by the processor, and storing the reconstructed domain features in a fifth data structure, thereby permitting quantitative analysis of the image by the processor based at least on the reconstructed domain features.

In further related computer system embodiments, the internal second material processing module may be further configured to geometrically distinguish, in a manner automated by the processor, domain features in the image that include at least one internal second material pocket from domain features in the image without any internal second material pocket. The watershed processing module may be configured to separate the second material regions into geometrically distinctive second material pockets by, in a manner automated by the processor, determining at least one of: a distance transform, a local extreme, and a numerical reconstruction algorithm. The internal second material processing module may be further configured to distinguish second material pockets that are internal to domain features by a process comprising determining a degree of sphericity of the second material pockets. The domain features of the image may comprise, for example, at least one of: thin walls of a closed-pore insulation foam, thin sections of a variable diameter fiber, thin walls of a separation plate in a mechanical or electrical assembly, and thin walls of a material particle sample. The domain features can also comprise thin walls of an amorphous solid dispersion of a drug substance; and may comprise thin walls of a spray-dried amorphous solid dispersion. The computer system may further comprise a particle size distribution module configured to perform a particle size distribution analysis, in a manner automated by the processor, based at least on the reconstructed domain features. The particle size distribution module may be configured to perform a particle size distribution of both particles with an internal second material pocket and particles without an internal second material pocket. The image intensity data components may comprise at least one of pixels and voxels, and the segmentation label values may comprise at least a label for the first material corresponding to the wall feature and a label of second material.

Another embodiment is a non-transitory computer-readable medium configured to store instructions for reconstructing a feature of an image for quantitative image analysis. The instructions, when loaded into working memory and executed by a processor, cause the processor to reconstruct the feature of the image for quantitative image analysis by: (i) initially segmenting image intensity data, in a manner automated by a processor, the initial segmentation comprising labeling each of a plurality of image intensity data components, stored in a first data structure, with a segmentation label value, thereby producing initially segmented image data with at least two material labels, a label for a first material and a label for a second material, stored in a second data structure; (ii) separating second material regions in the initially segmented image data into geometrically distinctive second material pockets, in a manner automated by the processor, thereby producing separated second material pocket data, stored in a third data structure; (iii) distinguishing second material pockets that are internal to domain features, formed of the first material, based on the separated second material pocket data, in a manner automated by the processor, thereby producing internal second material data stored in a fourth data structure; and (iv) reconstructing domain features of the image that comprise at least one internal second material pocket, in a manner automated by the processor, based at least on the internal second material data, and storing the reconstructed domain features in a fifth data structure, thereby permitting quantitative analysis of the image by the processor based at least on the reconstructed domain features.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
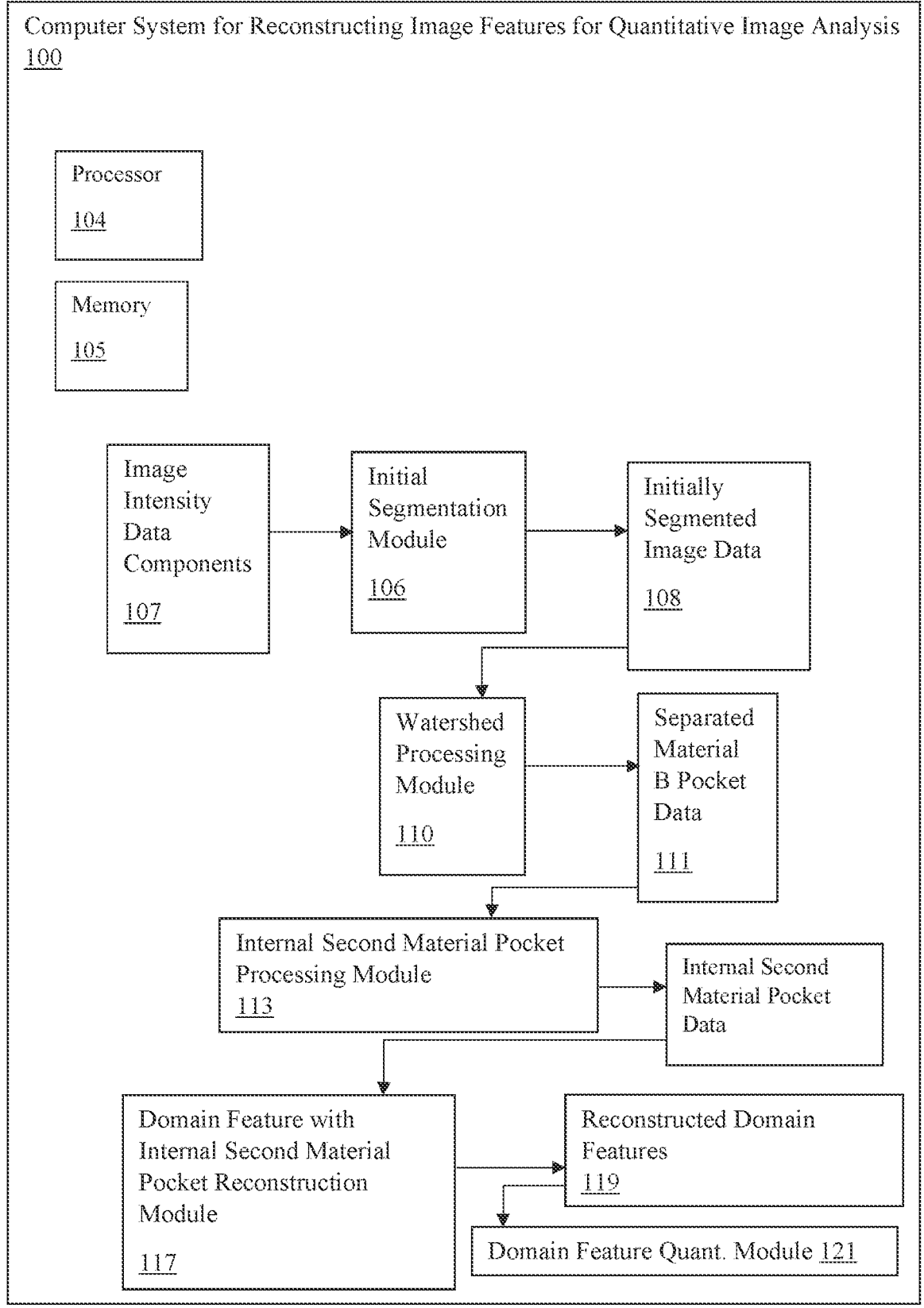
FIG. 1 is a schematic block diagram of a computer system for reconstructing a feature of an image for quantitative image analysis, in accordance with an embodiment of the invention.

A description of example embodiments follows.

Taught here is a method to reconstruct thin features that are marginally resolved by a multi-dimensional image, where the method uses geometrical continuity.

Image-based characterization methods are increasingly important in microstructure analysis. One example application of such image-based microstructure characterizations is the analysis of spray-dried particles, commonly seen in the pharmaceutical and food industries. In the pharmaceutical industry, spray drying is a common approach used to produce an amorphous solid dispersion (ASD) of a drug substance to improve both in vitro and in vivo performance of poorly water-soluble drugs (1-3). The properties of spray dried particles (SDPs), particularly their internal microstructure, dictates the processability of the drug dosage form, its manufacturability during various upscaling stages, and the bioavailability of the final drug product. These properties depend on a variety of formulation and processing parameters (4-9), which conventional characterization techniques can be ineffective in evaluating.

Imaging tools such as X-Ray Micro-computed tomography (MicroCT) (7, 12), cryoSEM (8), and focused ion beam-scanning electronic microscopy (FIB-SEM) (10, 11) provide an opportunity to thoroughly characterize the internal microstructure of spray dried particles. MicroCT generates images based on density differences between phases. In this example embodiment of the invention, a spray dried particle (SDP) corresponds to a domain feature. Amorphous Solid Dispersion (ASD) solid material corresponds to the first material, where the broken wall feature due to insufficient resolution is found. Air void corresponds to the second material. MicroCT can probe the internal structure of thousands of particles at the same time. Quantitative analysis can help achieve deeper understanding on how a spray drying process impacts the properties of the spray dried particles, as well as how such properties influence downstream processability and product performance.

Extracting numerical information of large numbers of particles manually from thousands of MicroCT images is impractically time consuming and labor intensive. Computer facilitated segmentation is often the necessary first step of any image analysis, which converts pixels (2D) or voxels (3D) from the image into quantifiable components before it can be further analyzed quantitatively. Traditionally, the thresholding method has been widely used for image segmentation (13). For SDP MicroCT images, however, the threshold method cannot differentiate the void within a spray dried particle from void space outside the particle. With an artificial intelligence-based image segmentation algorithm (AIBIS), the limitations of the conventional threshold approach can be overcome (14). The AIBIS algorithm (15) mimics the human eye, which can recognize a feature not only based on the greyscale value of pixels, but also on its relationship with its surrounding pixels. The artificial intelligence engine first learns through a training set, and applies that knowledge to all images.

Gamble et. al. 2016 (7) published one of the earliest studies using 3D X-Ray Microscopy to characterize SDPs. In the paper, 20 particles from each 3D scan were randomly selected to analyze, which makes an assessment on particle size distribution (PSD) difficult due to lack of statistical sampling. In comparison, a method taught herein can characterize several thousand particles for each sample, to provide more statistical significance. By selecting the particles manually, Gamble et. al. 2016 avoided several challenges, a). Management of broken particles due to insufficient resolution; b). Classification of particles with void and particles without void. The paper conducted image segmentation of particle wall and internal void manually, on each individual particle. The labor-intensive nature of the process is the reason that only 20 particles are analyzed.

Figure 2A:
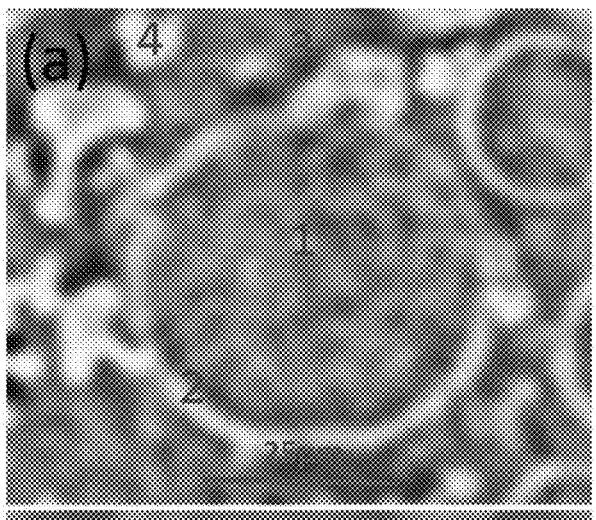
FIGS. 2A-2D are diagrams illustrating a typical particle morphology under Micro-Computed tomography (MicroCT) and Scanning Electron Microscopy (SEM), for which image data is to be reconstructed, along with particle wall segmentations by conventional methods and using an embodiment according to the invention.
Figure 2B:
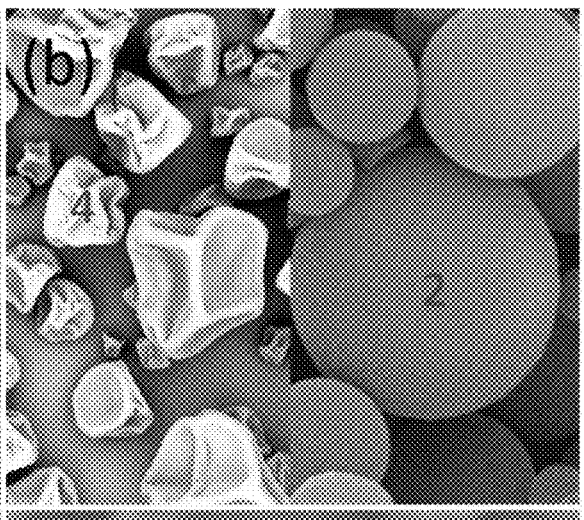
Figure 2C:
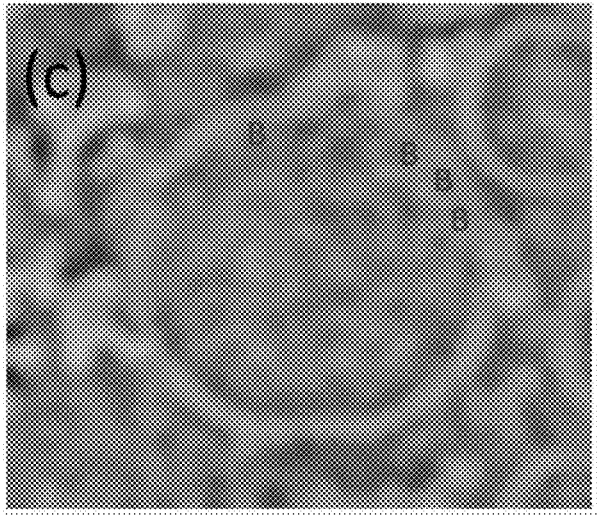
Figure 2D:
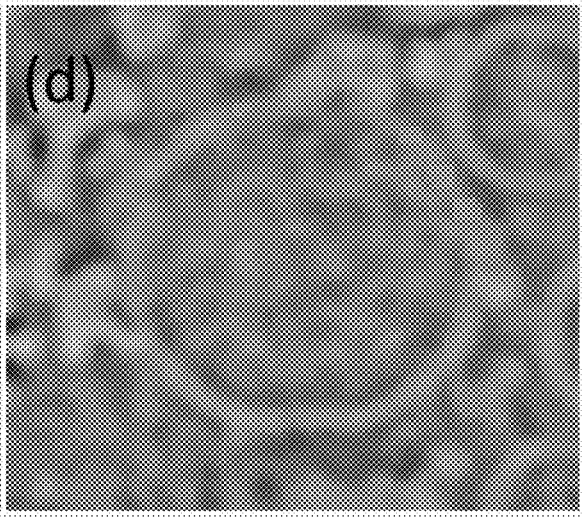

FIGS. 2A-2D illustrate typical particle morphology under MicroCT (FIG. 2A) and SEM (FIG. 2B), along with particle wall segmentations by conventional methods (FIG. 2C) and using an embodiment according to the invention (FIG. 2D). In FIGS. 2A-2D, label 1 corresponds to an air void internal to a SDP, that can be visualized with MicroCT but not SEM. Label 2 corresponds to the solid wall of an SDP, which can be visualized with both MicroCT and SEM. Label 3 corresponds to the air space between particles, which needs to be differentiated from internal air void (Label 1). Label 4 corresponds to a collapsed particle without internal air void. FIG. 2C shows a particle wall segmentation using a conventional method. Four locations, labeled with "B", have an artificially broken wall due to marginal resolution.

Reconstruction of particle walls is critical for the quantification of the particles. Particle size distribution (PSD) requires a complete particle to be measured. Artificially broken walls will lead to classification of a particle as a broken particle without an internal void. Particle volume calculation will then only factor in the solid portion, leading to an order of magnitude smaller PSD. Traditional segmentation methods such as thresholding or edge detection (e.g., FIG. 2C) are not effective for several reasons. The image resolution is marginally sufficient to resolve the thin locations of the wall. Walls of neighboring particles may touch each other. Thicker walls will attenuate X-ray energy stronger than the neighbor with a thinner wall, causing the thinner wall to be insufficiently resolved. Air voids inside a particle have an intensity similar to that of the air gap outside the particle, making it difficult to discern the inner and outer air when the thickness of the wall separating the two is only marginally resolved. Last but not least, particles often do not have a perfectly spherical shape, which leads to uneven attenuation and intensifies the issue of an artificially broken thin wall.

An embodiment taught herein provides a method that can quantify particles, including but not limited to SDPs, more accurately and efficiently, by overcoming image processing difficulties on reconstruction of thin particle walls due to resolution limits. FIG. 2D illustrates the broken wall being reconstructed with such a method.

FIG. 1 is a schematic block diagram of a computer system 100 for reconstructing a feature of an image for quantitative image analysis, in accordance with an embodiment of the invention. The components of this system are first discussed, and their operation is later illustrated with reference to FIG. 3. In FIG. 1, the computer system 100 includes a processor 104 and a memory 105, which stores computer code instructions. The processor 104 and the memory 105, with the computer code instructions, are configured to implement: an initial segmentation module 106, a watershed processing module 110, an internal second material pocket (air void in the SDP case) processing module 113, and a domain feature with internal second material pocket reconstruction module 117. In addition, in other embodiments according to the invention, the processor 104 and memory 105 may be configured to implement domain feature quantification module such as particle size distribution and wall thickness distribution 121, or other modules configured to perform quantitative analysis of image features that include the reconstructed domain features 119. It will be appreciated that processor 104 and memory 105 may be implemented on one or more separate processors and one or more separate memories, any combination of which cooperate together to implement all or a portion of embodiments herein.

In the embodiment of FIG. 1, the computer system 100 comprises an initial segmentation module 106 configured to initially segment image intensity data, in a manner automated by a processor 104. The initial segmentation comprises labeling each of a plurality of image intensity data components, such as pixels and/or voxels, stored in a first data structure 107, with a segmentation label value (such as a label for a void and a label for a solid), thereby producing initially segmented image data stored in a second data structure 108. A watershed processing module 110 is configured to separate void regions in the initially segmented image data 108 into geometrically distinctive void pockets, in a manner automated by the processor 104, thereby producing separated void pocket data, stored in a third data structure 111. An internal void processing module 113 is configured to distinguish void pockets that are internal to domain features, based on the separated void pocket data 111, in a manner automated by the processor 104, thereby producing internal void data stored in a fourth data structure 115. A hollow solid reconstruction module 117 is configured to reconstruct solid features of the image that comprise at least one internal void, based at least on the internal void data 115, in a manner automated by the processor 104, and storing the reconstructed solid features in a fifth data structure 119, thereby permitting quantitative analysis of the image by the processor 104 based at least on the reconstructed solid features 119.

The internal void processing module 113 can be further configured to geometrically distinguish, in a manner automated by the processor 104, solid features in the image that include at least one internal void from solid features in the image without any internal voids. For example, a solid particle with an internal void 3 (see FIG. 4) can be distinguished from a solid particle 4 without an internal void. The watershed processing module 110 (in FIG. 1) can be configured to separate the void regions into geometrically distinctive void pockets by, in a manner automated by the processor 104, determining at least one of: a distance transform, a local extreme, and a numerical reconstruction algorithm. The internal void processing module 113 can be further configured to distinguish void pockets that are internal to domain features by a process comprising determining a degree of sphericity of the void pockets. The solid features of the image can, for example, comprise at least one of: thin walls of a closed-pore insulation foam, thin sections of a variable diameter fiber, thin walls of a separation plate in a mechanical or electrical assembly, and thin walls of a material particle sample. It will be appreciated that other solid features of an image can be reconstructed, including other thin wall image structures that are marginally resolved. The solid features can, for example, comprise thin walls of an amorphous solid dispersion of a drug substance; and can comprise thin walls of a spray-dried amorphous solid dispersion. The computer system can further comprise a particle size distribution module 121 configured to perform a particle size distribution analysis, in a manner automated by the processor 104, based at least on the reconstructed solid features 119. The particle size distribution module 121 can be configured to perform, separately, a particle size distribution of both particles with an internal void and particles without an internal void.

Although "air" voids are discussed herein, it should be appreciated that image reconstruction techniques taught herein need not apply to images of air as a gas, but can include analysis of any space that appears as a separate phase in an image, and in particular can be used to distinguish internal pockets from external pockets, so that, for example, the internal pockets of particles can be distinguished from the external pockets surrounding those particles, particularly for thin walled particles.

Figure 3:
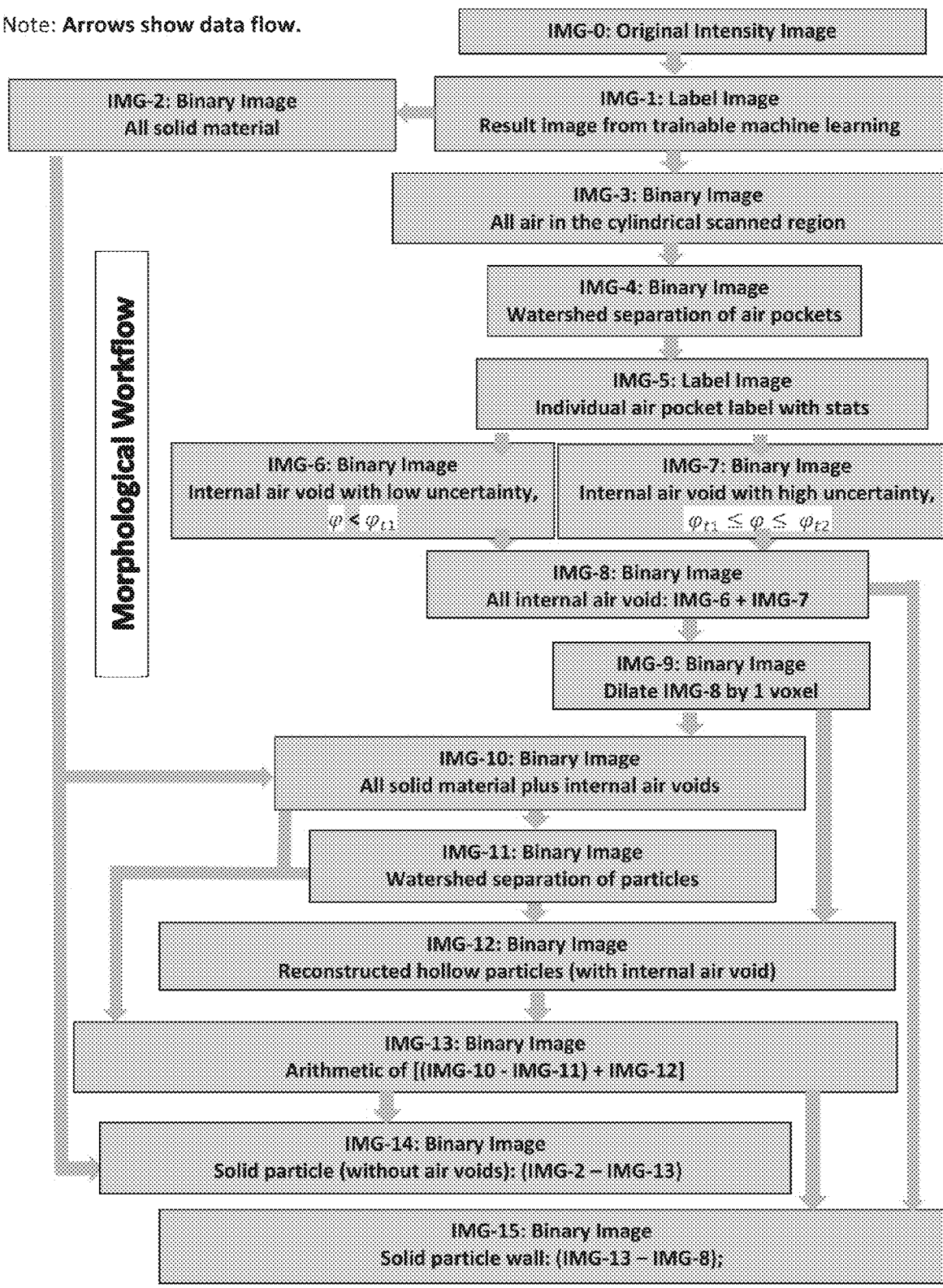
FIG. 3 is a schematic block diagram illustrating the workflow of a method in accordance with an embodiment of the invention.

In an embodiment, a morphological segmentation method is designed to reconstruct a particle wall that is marginally resolved. FIG. 3 is a schematic block diagram illustrating the workflow of a method in accordance with an embodiment of the invention. The block diagram focuses on the production of image data, indicated as IMG-0 through IMG-15, which is performed at a series of stages of the method. It will be appreciated that, where not specifically indicated, these images can be produced by one or more of the modules 106, 110, 113, 117 and 121 of FIG. 1, or by other modules implemented by processor 104 and memory 105, in accordance with teachings herein.

In FIG. 3, IMG-0 is an input intensity image. It can be any type of image acquired by any imaging devices. In an embodiment, IMG-0 can be an MicroCT 3D image, stored as 16-bit unsigned integers.

IMG-1 is an initial segmentation, which can be performed by initial segmentation module 106 of FIG. 1. The segmentation can be conducted using any segmentation method. In an embodiment, a supervised machine learning process with training is used. A segmented image is also referred to as labeled image, where each and every voxel from IMG-0 (of FIG. 3) is labeled as a unique material phase with an integer, or label value. In an embodiment, illustrated in FIG. 4, a label value of 0 refers to the background region outside the imaged cylindrical volume, a label value of 1 refers to air outside the particles, a label value of 2 refers to solid drug material, a label value of 3 refers to an air void internal to a particle.

Figure 4:
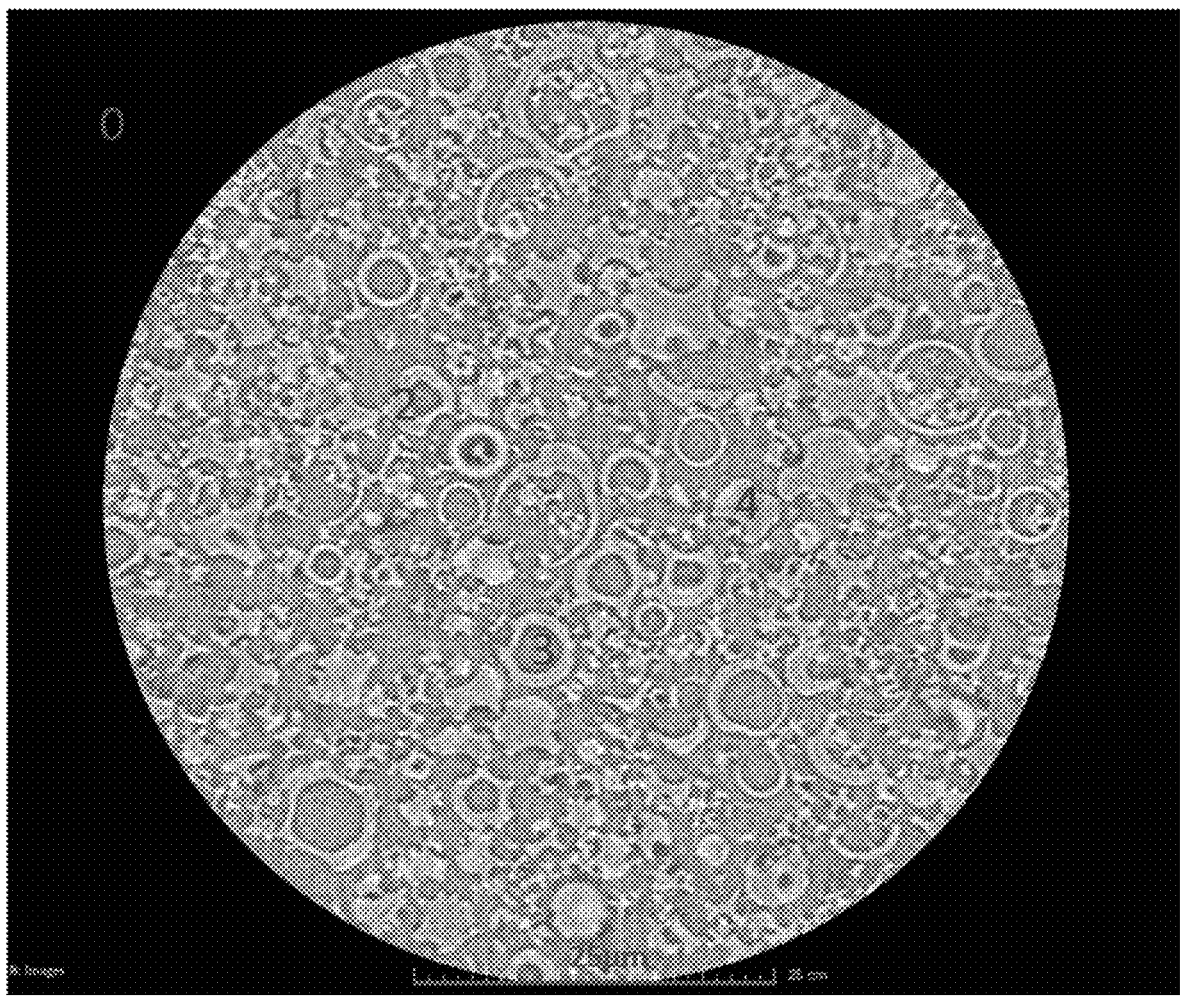
FIG. 4 is an image illustrating label values and image features that can be used in accordance with an embodiment of the invention.

FIG. 4 is an image illustrating label values and image features that can be used in accordance with an embodiment of the invention. In FIG. 4, label 0 represents the background, label 1 represents air pockets outside a particle, label 2 represents a solid particle wall of a hollow particle, label 3 represents an air void internal to a hollow particle, and label 4 represents a solid particle without an internal air void. Together, components 2 and 3 form a hollow particle (that is, a solid particle wall with an internal air void), while components 2 and 4 are both examples of solid material.

Returning to FIG. 3, IMG-2 is a binary image (a label image with only two labels, 0 and 1), which is derived from IMG-1 by setting the label of the pixels corresponding to solid drug material phase to 1. This can, for example, also be performed by initial segmentation module 106 of FIG. 1.

IMG-3 of FIG. 3 is another binary image, which is derived from IMG-1 by setting the label of the pixels corresponding to air (both internal and external to a particle) as 1. Note the background region outside the imaged cylindrical volume is excluded. This can, for example, also be performed by initial segmentation module 106 of FIG. 1.

IMG-4 of FIG. 3 is a binary image that is the result of watershed separation of IMG-3, which can be performed by watershed processing module 110 of FIG. 1. In this image, IMG-4 of FIG. 3, all air is separated into pockets regardless of whether it is inside a particle or outside. Watershed separation performed by watershed processing module 110 of FIG. 1 can, for example, use one or more of a distance transform, local extrema, and numerical reconstruction algorithms to create watershed lines to separate geometrically distinctive air pockets. An air pocket inside a particle is more spherical than an air pocket between a few particles, and thus can be recognized based on its sphericity, as taught herein.

IMG-5 of FIG. 3 is a label image where each individual air pocket from IMG-4 is assigned a unique label. This can, for example, be performed by internal void processing module 113. Along with individual labeling, a suite of geometrical parameters for each air pocket is computed, including 3D surface area and volume. A sphericity parameter, $$\varphi = \frac{\pi^{\frac{1}{3}}(6V)^{\frac{2}{3}}}{A},$$

is calculated. A perfect sphere will have φ=1.0. In practice, an air pocket reconstructed from a 3D image will never have φ=1.0, due to both the particle shape variations from a perfect sphere and the digitization with voxels. φ is always less than 1.0.

IMG-6 of FIG. 3 is a binary image of internal air voids from IMG-5, where all air pockets with sphericity greater than a sphericity threshold $\varphi_{t1}$ is assigned label 1. This can, for example, be performed by internal void processing module 113. These air pockets with high sphericity, greater than sphericity threshold $\varphi_{t1}$, are more likely to be air voids internal to particles. In an embodiment, for IMG-6, a $\varphi_{t1}$ value of 0.75 can be considered the optimal. It will be appreciated that other thresholds can be used. To reduce the false positives caused by small air pockets (which is often associated with imaging noise), a volume filtering is often necessary to remove very small air pockets, such as those with a volume of less than 5 voxels.

IMG-7 of FIG. 3 is a binary image of internal air voids derived from IMG-5, where all air pockets with sphericity greater or equal than threshold $\varphi_{t1}$, but less or equal than threshold $\varphi_{t2}$ are assigned with label 1. This can, for example, be performed by internal void processing module 113. In an embodiment, for IMG-7, a $\varphi_{t2}$ a value of 0.88 can be considered the optimal. It will be appreciated that other thresholds can be used. Visual inspection on false positives may be necessary to remove air pockets that are obviously not internal air voids.

IMG-8 of FIG. 3 is a binary image produced by the summation of IMG-6 and IMG-7, which represents all internal air voids.

IMG-9 is a binary image produced by dilating IMG-8 by one voxel. The goal of this step is to guarantee that internal air voids (IMG-8) and their surrounding drug solid material (IMG-2) are connected, to prepare the calculation of IMG-12 later. This procedure for IMG-9 is an example of the thin wall feature being reconstructed using a morphological operation of the second material pocket identified as internal.

IMG-10 is a binary image produced by the summation of IMG-2 and IMG-9. It represents all drug particles plus their internal voids. Note solid drug particles without internal void filled air-voids are included.

IMG-11 is a binary image generated by applying watershed separation algorithm on IMG-10.

IMG-12 is a binary image reconstructed using internal air void (IMG-9) as a marker image and all solid particles (IMG-11) as a mask image. It contains all solid particles with at least one internal air void. This can, for example, be performed using hollow solid reconstruction module 117 of FIG. 1. IMG-12 of FIG. 3 can be used to classify two populations of particles, one with internal air voids, one without. Particle size distribution can then be generated, for example by particle size distribution module 121, for all three scenarios: (a). all particles; (b). particles with internal air void, or hollow particles; (c). particles without internal air void, or solid particles.

IMG-13 is a binary image produced by the arithmetic of IMG-10 minus IMG-11 plus IMG-12. It is all the hollow drug particles with internal air voids, but not separated.

IMG-14 is a binary image produced by subtracting IMG-13 from IMG-2. It contains all the particles in the image that are solid without any internal air voids.

IMG-15 is a binary image produced by subtracting IMG-8 from IMG-13. Label 1 of this image contains the voxels corresponding to all hollow particles. Their internal air void voxels are assigned to label 0. IMG-15 is useful to calculate thickness distribution of the hollow particles, and solid material amount per particle in order to convert to effective drug content per particle. In order to compute particle numbers, a variant of IMG-15 may be obtained by (IMG-12-IMG-8) where all hollow drug particles are separated.

Advantages that can be achieved by embodiments according to the invention can, for example, include one or more of the following:

1. A method can reconstruct a particle wall that is incomplete due to marginal resolution.
2. A method can separate the air void inside a particle from the air pocket between particles.
3. A method can classify particles according to the existence of one or more internal voids.
4. A method can produce particle size distributions for all particles, including hollow particles with internal voids and solid particles without internal voids.

It will be appreciated that other advantages can be provided by embodiments taught herein.

Figure 5:
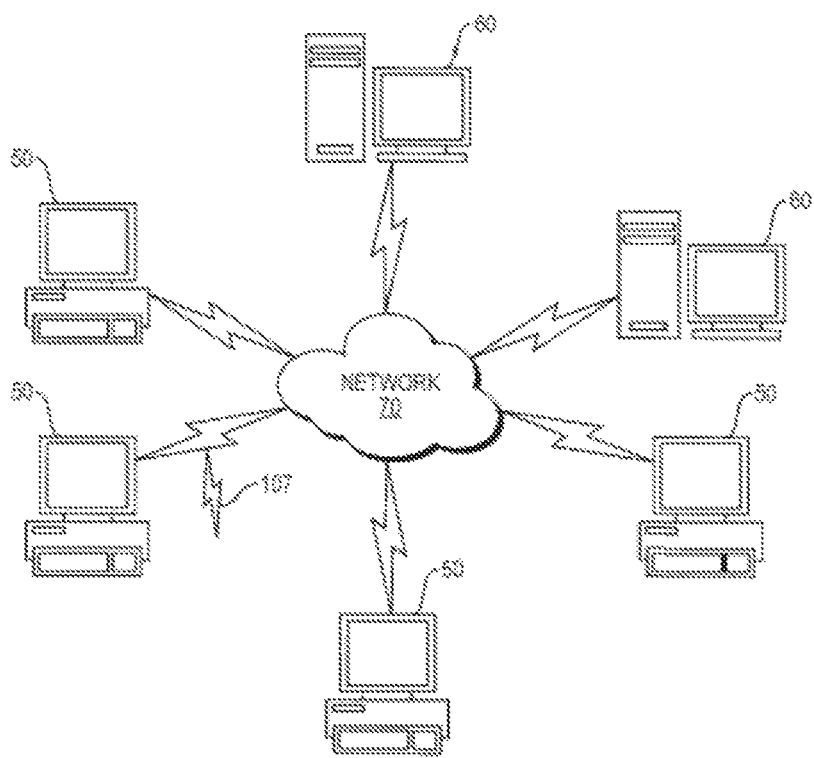
FIG. 5 illustrates a computer network or similar digital processing environment in which embodiments of the present invention may be implemented.

FIG. 5 illustrates a computer network or similar digital processing environment in which embodiments of the present invention may be implemented. Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
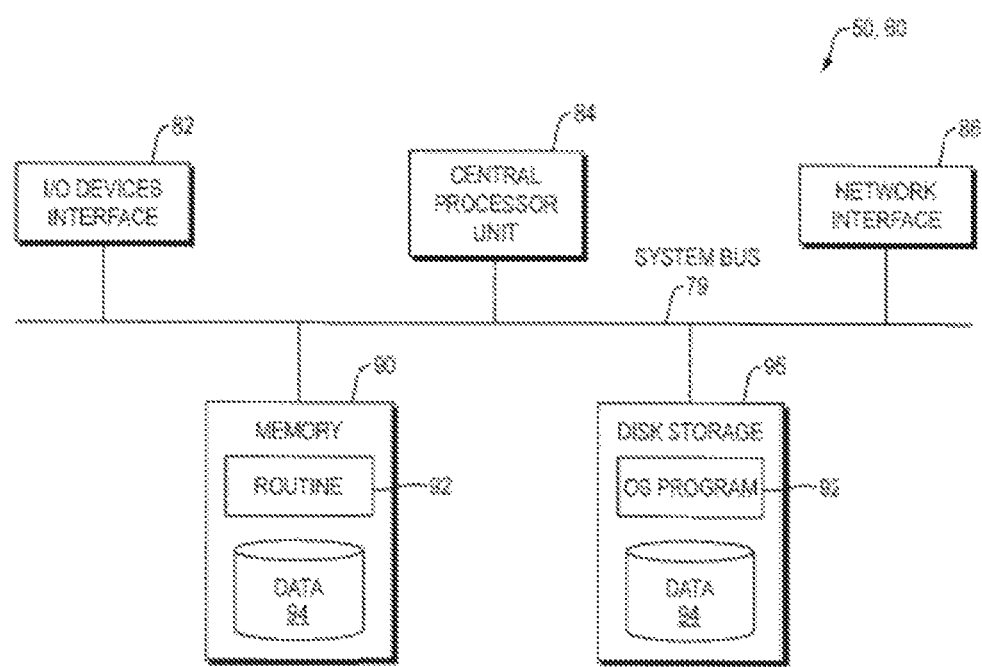
FIG. 6 is a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (including, for example, to implement one or more of: system 100, modules 106, 110, 113, and 117 and their models and methods, and corresponding data structures 107, 108, 111, 115 and 119, detailed herein). Disk storage 95 provides non-volatile storage for computer software instructions 92 and data 94 used to implement an embodiment of the present invention. A central processor unit 84 is also attached to the system bus 79 and provides for the execution of computer instructions, for example having a flow of data and control as taught herein.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection 107. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

In other embodiments, the software instructions 92 and data 94 are provided on a cloud platform, as SaaS (Software as a Service), and the like.

REFERENCES

1. Hancock B C, Zografi G. Characteristics and significance of the amorphous state in pharmaceutical systems. J Pharm Sci. 1997; 86(1):1-12.
2. Newman A, Knipp G, Zografi G. Assessing the performance of amorphous solid dispersions. J Pharm Sci-Us. 2012; 101(4):1355-1377.
3. Yu L. Amorphous pharmaceutical solids: preparation, characterization and stabilization. Adv Drug Deliver Rev. 2001; 48(1):27-42.
4. Vehring R. Pharmaceutical particle engineering via spray drying. Pharm Res-Dord. 2008; 25(5):999-1022.
5. Vehring R, Foss W R, Lechuga-Ballesteros D. Particle formation in spray drying. J Aerosol Sci. 2007; 38(7): 728-746.
6. Littringer E M, Mescher A, Schroettner H, Achelis L, Walzel P, Urbanetz N A. Spray dried mannitol carrier particles with tailored surface properties—The influence of carrier surface roughness and shape. Eur J Pharm Biopharm. 2012; 82(1):194-204.
7. Gamble J F, Terada M, Holzner C, Lavery L, Nicholson S J, Timmins P, Tobyn M. Application of X-ray microtomography for the characterisation of hollow polymer-stabilised spray dried amorphous dispersion particles. Int J Pharmaceut. 2016; 510(1):1-8.
8. Gamble J F, Ferreira A P, Tobyn M, DiMemmo L, Martin K, Mathias N, Schild R, Vig B, Baumann J M, Parks S, Ashton M. Application of imaging based tools for the characterisation of hollow spray dried amorphous dispersion particles. Int J Pharmaceut. 2014; 465(1-2):210-217.
9. Ohta M, Buckton G. A study of the differences between two amorphous spray-dried samples of cefditoren pivoxil which exhibited different physical stabilities. Int J Pharmaceut. 2005; 289(1-2):31-38.
10. Poozesh S, Setiawan N, Arce F, Sundararaj an P, Della Rocca J, Rumondor A, Wei D, Wenslow R, Xi H M, Zhang S, Stellabott J, Su Y C, Moser J, Marsac P J. Understanding the process-product-performance interplay of spray dried drug-polymer systems through complete structural and chemical characterization of single spray dried particles. Powder Technol. 2017; 320:685-695.
11. Heng D, Tang P, Cairney J M, Chan H K, Cutler D J, Salama R, Yun J. Focused-ion-beam milling: A novel approach to probing the interior of particles used for inhalation aerosols. Pharm Res-Dord. 2007; 24(9):1608-1617.
12. Wong J, D'Sa D, Foley M, Chan J G Y, Chan H K. NanoXCT: A Novel Technique to Probe the Internal Architecture of Pharmaceutical Particles. Pharm Res-Dord. 2014; 31(11):3085-3094.
13. Gonzalez & Woods, Digital image Processing, Third Edition, Prentice Hall, 2008
14. Zhang S, Neilly J, Zhu A, Chen J, Danzer G. Quantitative Characterization of Crystallization in Amorphous Solid Dispersion Drug Tablets Using X-Ray Micro-Computed Tomography. Microscopy and Microanalysis. 2018; 24(Suppl 1):2, p. 1400-1401.
15. Witten I H, E. F, A. H M, J. P C. Data Mining: Practical Machine Learning Tools and Techniques: Morgan Kaufmann; 2016.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of reconstructing a domain feature of an image for quantitative image analysis, the computer-implemented method comprising:
    initially segmenting image intensity data, with a processor, the initial segmenting comprising labeling each of a plurality of image intensity data components, stored in a first data structure, with a segmentation label value, thereby producing initially segmented image data with at least two material labels, a label for a first material and a label for a second material, stored in a second data structure;
    separating second material regions in the initially segmented image data into geometrically distinctive second material pockets, with the processor, thereby producing separated second material pocket data, stored in a third data structure;
    distinguishing second material pockets that are internal to domain features, formed of the first material, based on the separated second material pocket data, with the processor, thereby producing internal second material pocket data stored in a fourth data structure; and
    reconstructing domain features of the image that comprise at least one internal second material pocket, with the processor, based at least on the internal second material data, and storing the reconstructed domain features in a fifth data structure, thereby permitting quantitative analysis of the image by the processor based at least on the reconstructed domain features.

2. The computer-implemented method of claim 1, further comprising:
    geometrically distinguishing, with the processor, domain features in the image that include at least one internal second material pocket from domain features in the image without any internal second material pocket.

3. The computer-implemented method of claim 1, wherein separating the second material regions into geometrically distinctive second material pockets comprises, with the processor, determining at least one of: a distance transform, a local extreme, and a numerical reconstruction algorithm.

4. The computer-implemented method of claim 1, wherein distinguishing second material pockets that are internal to domain features comprises determining a degree of sphericity of the second material pockets.

5. The computer-implemented method of claim 1, wherein the domain features of the image comprise at least one of: thin walls of a closed-pore insulation foam, thin sections of a variable diameter fiber, thin walls of a separation plate in a mechanical or electrical assembly, and thin walls of a material particle sample.

6. The computer-implemented method of claim 5, wherein the solid features comprise thin walls of an amorphous solid dispersion of a drug substance.

7. The computer-implemented method of claim 6, wherein the solid features comprise thin walls of a spray-dried amorphous solid dispersion.

8. The computed-implemented method of claim 1, wherein the thin wall feature is reconstructed using a morphological operation of the second material pocket identified as internal.

9. The computer-implemented method of claim 1, further comprising:
performing a domain feature size distribution analysis, with the processor, based at least on the reconstructed domain features.

10. The computer-implemented method of claim 9, wherein the domain feature quantification comprises determining a domain feature size distribution of both domain features with an internal second material pocket and domain features without an internal second material pocket, and determining domain wall thickness distribution.

11. The computer-implemented method of claim 1, wherein the image intensity data components comprise at least one of pixels and voxels, and wherein the segmentation label values comprise a label for the first material and a label for a second material.

12. A computer system for reconstructing a feature of an image for quantitative image analysis, the computer system comprising:
an initial segmentation module configured to initially segment image intensity data, with a processor, the initial segmenting comprising labeling each of a plurality of image intensity data components, stored in a first data structure, with a segmentation label value, thereby producing initially segmented image data, with at least two material labels, a label for a first material and a label for a second material, stored in a second data structure;
a watershed processing module configured to separate second material regions in the initially segmented image data into geometrically distinctive second material pockets, with the processor, thereby producing separated second material pocket data, stored in a third data structure;
an internal second material pocket processing module configured to distinguish second material pockets that are internal to domain features, formed of the first material, based on the separated second material pocket data, with the processor, thereby producing internal second material data stored in a fourth data structure; and
a domain feature reconstruction module configured to reconstruct domain features of the image that comprise at least one internal second material pocket, based at least on the internal second material pocket data, with the processor, and storing the reconstructed domain features in a fifth data structure, thereby permitting quantitative analysis of the image by the processor based at least on the reconstructed domain features.

13. The computer system of claim 12, wherein the internal second material processing module is further configured to geometrically distinguish, with the processor, domain features in the image that include at least one internal second material pocket from solid features in the image without any internal second material pockets.

14. The computer system of claim 12, wherein the watershed processing module is configured to separate the second material regions into geometrically distinctive second material pockets by, with the processor, determining at least one of: a distance transform, a local extreme, and a numerical reconstruction algorithm.

15. The computer system of claim 12, wherein the internal second material processing module is further configured to distinguish second material pockets that are internal to domain features by a process comprising determining a degree of sphericity of the second material pockets.

16. The computer system of claim 12, wherein the domain features of the image comprise at least one of: thin walls of a closed-pore insulation foam, thin sections of a variable diameter fiber, thin walls of a separation plate in a mechanical or electrical assembly, and thin walls of a material particle sample.

17. The computer system of claim 16, wherein the solid features comprise thin walls of an amorphous solid dispersion of a drug substance.

18. The computer system of claim 17, wherein the solid features comprise thin walls of a spray-dried amorphous solid dispersion.

19. The computer system of claim 12, wherein the thin wall feature is reconstructed using a morphological operation of the second material pocket identified as internal.

20. The computer system of claim 12, further comprising:
a domain feature quantification module configured to perform a domain feature size distribution analysis and wall thickness analysis, with the processor, based at least on the reconstructed solid features.

21. The computer system of claim 20, wherein the domain feature size distribution module is configured to perform a domain feature size distribution of both domains with an internal second material pocket and domains without an internal second material pocket.

22. The computer system of claim 12, wherein the image intensity data components comprise at least one of pixels and voxels, and wherein the segmentation label values comprise a label for a void and a label for a solid.

23. A non-transitory computer-readable medium configured to store instructions for reconstructing a feature of an image for quantitative image analysis, the instructions, when loaded into working memory and executed by a processor, cause the processor to reconstruct the feature of the image for quantitative image analysis by:
initially segmenting image intensity data, with the processor, the initial segmenting comprising labeling each of a plurality of image intensity data components, stored in a first data structure, with a segmentation label value, thereby producing initially segmented image data with at least two material labels, a label for a first material and a label for a second material, stored in a second data structure;

separating second material regions in the initially segmented image data into geometrically distinctive second material pockets, with the processor, thereby producing separated second material pocket data, stored in a third data structure;

distinguishing second material pockets that are internal to domain features, formed of the first material, based on the separated second material pocket data, with the processor, thereby producing internal second material pocket data stored in a fourth data structure; and reconstructing domain features of the image that comprise at least one internal second material pocket, with the processor, based at least on the internal second material data, and storing the reconstructed domain features in a fifth data structure, thereby permitting quantitative analysis of the image by the processor based at least on the reconstructed domain features.

* * * * *